US012737214B2

(12) United States Patent
Sun et al.

(10) Patent No.: US 12,737,214 B2

(45) Date of Patent: Sep. 15, 2026

(54) EFFICIENT CONTAINER MIGRATION

(71) Applicant: International Business Machines Corporation, Armonk, NY (US)

(72) Inventors: Yu Sun, Shanghai (CN); Zhan Peng Huo, Beijing (CN); Da Long Wang, Hangzhou (CN); Hong Yi Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 18/587,066

(22) Filed: Feb. 26, 2024

(65) Prior Publication Data

US 2025/0272130 A1 Aug. 28, 2025

(51) Int. Cl.
*G06F 9/455* (2018.01)

(52) U.S. Cl.
CPC .. *G06F 9/45558* (2013.01); *G06F 2009/4557* (2013.01); *G06F 2009/45579* (2013.01)

(58) Field of Classification Search
CPC .................................................. G06F 9/45558
USPC ............................................................. 718/1
See application file for complete search history.

(56) References Cited

U.S. PATENT DOCUMENTS 10,768,973 B1 9/2020 Jin et al.
11,055,012 B2 7/2021 Makin et al.
11,249,815 B2 2/2022 Bourbonnais et al.
11,556,499 B2 1/2023 Wu et al.
2024/0362014 A1* 10/2024 Hursey .................... G06F 8/63

OTHER PUBLICATIONS

Zerouali, Ahmed. "Analyzing technical lag in docker images." Benevol 2018. 2018. (Year: 2018).*
Gonzalez-Barahona, Jesus M. "Characterizing outdateness with technical lag: an exploratory study." Proceedings of the IEEE/ACM 42nd International Conference on Software Engineering Workshops. 2020. (Year: 2020).*
Ma et al., "Efficient Live Migration of Edge Services Leveraging Container Layered Storage," IEEE Transactions on Mobile Computing, Sep. 2019, pp. 2020-2033, vol. 18, No. 9, Institute of Electrical and Electronics Engineers, accessed Feb. 8, 2024.

* cited by examiner

*Primary Examiner* — Charlie Sun
(74) *Attorney, Agent, or Firm* — Yee & Associates, P.C.

(57) ABSTRACT

Container migration is provided. A comparison of a second image and a third image is performed to detect data changes made by write input/output operations occurring between a second timestamp and a third timestamp. It is determined whether a set of data changes exists in the third image that occurred between the second timestamp and the third timestamp. In response to determining that the set of data changes does exist in the third image that occurred between the second timestamp and the third timestamp, a copy of the set of data changes is sent to a second host node. The set of data changes are merged into the second host node. The write input/output operations are resumed to the second host node using previously queued write input/output operations and new incoming write input/output operations so that the second host node is processing read input/output operations and the write input/output operations.

20 Claims, 7 Drawing Sheets

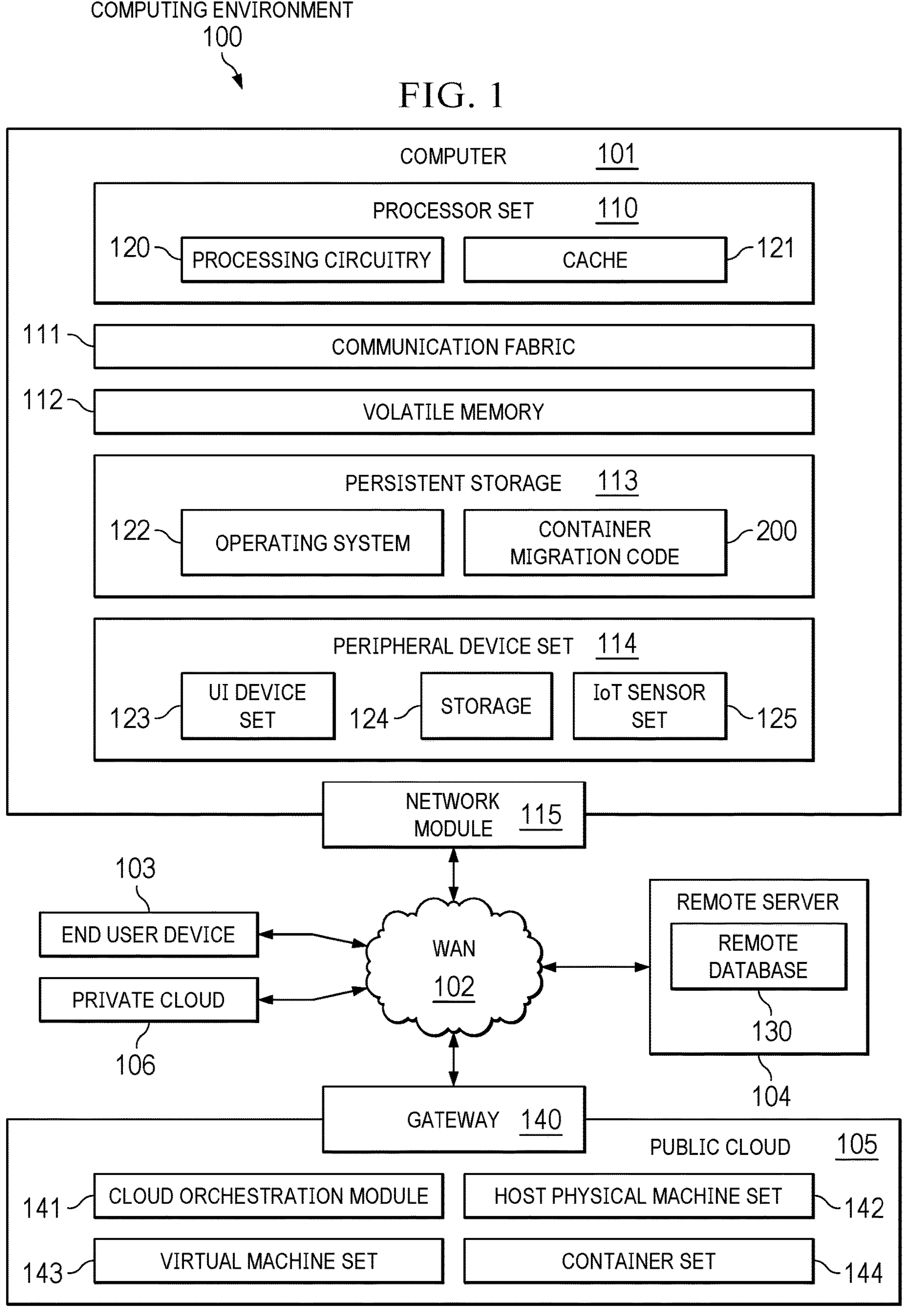
COMPUTING ENVIRONMENT
100
FIG. 1
COMPUTER 101
PROCESSOR SET 110
120
PROCESSING CIRCUITRY
CACHE
121
111
COMMUNICATION FABRIC
112
VOLATILE MEMORY
PERSISTENT STORAGE 113
122
OPERATING SYSTEM
CONTAINER MIGRATION CODE
200
PERIPHERAL DEVICE SET 114
123
UI DEVICE SET
124
STORAGE
IoT SENSOR SET
125
NETWORK MODULE 115
103
END USER DEVICE
PRIVATE CLOUD
106
WAN
102
REMOTE SERVER
REMOTE DATABASE
130
104
GATEWAY 140
PUBLIC CLOUD 105
141
CLOUD ORCHESTRATION MODULE
HOST PHYSICAL MACHINE SET
142
143
VIRTUAL MACHINE SET
CONTAINER SET
144

FIG. 4A

402 RECEIVE, BY A COMPUTER, A FIRST INPUT TO GENERATE A FIRST CONTAINER ON A FIRST HOST NODE TO PROCESS READ INPUT/OUTPUT OPERATIONS AND WRITE INPUT/OUTPUT OPERATIONS CORRESPONDING TO A SERVICE USING A FIRST CONTAINER IMAGE THAT INCLUDES A PLURALITY OF ORIGINAL READ ONLY LAYERS

404 GENERATE, BY THE COMPUTER, UTILIZING A SCHEDULER AND MANAGEMENT MODULE, THE FIRST CONTAINER ON THE FIRST HOST NODE TO PROCESS THE READ INPUT/OUTPUT OPERATIONS AND THE WRITE INPUT/OUTPUT OPERATIONS CORRESPONDING TO THE SERVICE USING THE FIRST CONTAINER IMAGE THAT INCLUDES THE PLURALITY OF ORIGINAL READ ONLY LAYERS IN RESPONSE TO RECEIVING THE FIRST INPUT TO GENERATE THE FIRST CONTAINER ON THE FIRST HOST NODE

406 RECEIVE, BY THE COMPUTER, A SECOND INPUT TO PERFORM A CONTAINER MIGRATION TASK TO MIGRATE THE FIRST CONTAINER CORRESPONDING TO THE SERVICE FROM THE FIRST HOST NODE TO A SECOND HOST NODE, THE SECOND HOST NODE RESIDING ON ONE OF A SAME SITE AS THE FIRST HOST NODE OR A DIFFERENT SITE

408 QUEUE, BY THE COMPUTER, UTILIZING THE SCHEDULER AND MANAGEMENT MODULE, THE WRITE INPUT/OUTPUT OPERATIONS OF THE FIRST CONTAINER CORRESPONDING TO THE SERVICE IN OPERATING SYSTEM MEMORY AT A FIRST TIMESTAMP SO THAT THE FIRST CONTAINER BEING MIGRATED NOW ONLY PROCESSES THE READ INPUT/OUTPUT OPERATIONS CORRESPONDING TO THE SERVICE IN RESPONSE TO RECEIVING THE SECOND INPUT TO PERFORM THE CONTAINER MIGRATION TASK

410 EXECUTE, BY THE COMPUTER, UTILIZING A NEW LAYER GENERATION MODULE, A FIRST COMMIT COMMAND TO GENERATE A SECOND CONTAINER IMAGE BASED ON THE FIRST CONTAINER BEING MIGRATED IN RESPONSE TO QUEUING THE WRITE INPUT/OUTPUT OPERATIONS OF THE FIRST CONTAINER BY GENERATING A FIRST NEW READ ONLY LAYER IN THE SECOND CONTAINER IMAGE BASED ON CONTENTS OF A READ/WRITE LAYER OF THE FIRST CONTAINER BEING MIGRATED, THE FIRST NEW READ ONLY LAYER IS A TOP LAYER OF THE SECOND CONTAINER IMAGE WITH THE PLURALITY OF ORIGINAL READ ONLY LAYERS OF THE FIRST CONTAINER IMAGE BEING BELOW THE FIRST NEW READ ONLY LAYER

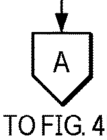

TO FIG. 4B

EFFICIENT CONTAINER MIGRATION

BACKGROUND

The disclosure relates generally to container-based environments and more specifically to migrating containers.

A container-based environment, architecture, platform, or the like, such as, for example, Kubernetes® (a registered trademark of the Linux Foundation of San Francisco, CA, USA), provides a structural design for automating deployment, scaling, and operations of containers across host nodes. A host node is a machine, either physical or virtual, where containers (i.e., applications) are deployed. A container is a version of a container image and is ready to run as an application corresponding to a service. In other words, the container image becomes the container at runtime. The container includes the environment for the application to run (e.g., file systems, environment variables, port mappings, and the like).

The container image is a set of files that includes the source code or binaries and configuration data needed for the application to run. The container image is a collection of read only files. The container image can be generated from a container using a commit command. The commit command captures a snapshot of the current state of the container.

SUMMARY

According to one illustrative embodiment, a computer-implemented method for container migration is provided. A computer performs a comparison of a first new read only layer of a second container image and a second new read only layer of a third container image to detect any data changes made by write input/output operations corresponding to a service occurring between a second timestamp when the write input/output operations were resumed to a first container on a first host node and a third timestamp when the write input/output operations of the first container were queued to operating system memory for a second time. The computer determines whether a set of data changes exists in the second new read only layer of the third container image that occurred between the second timestamp and the third timestamp based on the comparison. In response to the computer determining that the set of data changes does exist in the second new read only layer of the third container image that occurred between the second timestamp and the third timestamp based on the comparison, the computer sends a copy of the set of data changes to a second host node. The computer merges the set of data changes into a read/write layer of the second container corresponding to the service running on the second host node. The computer resumes the write input/output operations to the second container running on the second host node at a fourth timestamp using previously queued write input/output operations corresponding to the second container and new incoming write input/output operations to the second container so that the second container is processing read input/output operations and the write input/output operations corresponding to the service. According to other illustrative embodiments, a computer system and computer program product for container migration are provided.

BRIEF DESCRIPTION OF THE DRAWINGS

FIG. 1 is a pictorial representation of a computing environment in which illustrative embodiments may be implemented;

FIGS. 4A-4D are a flowchart illustrating a process for container migration in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
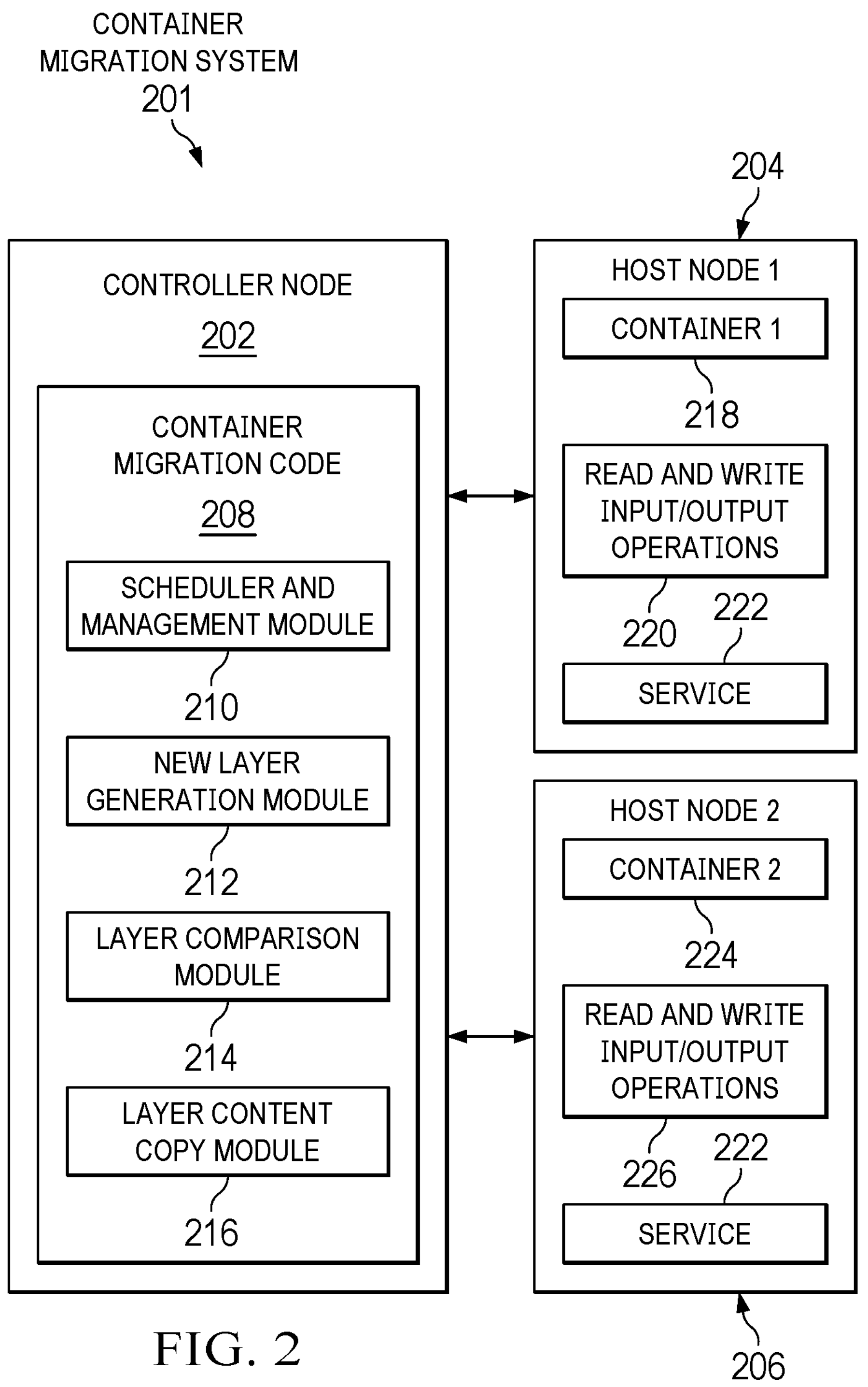
FIG. 2 is a diagram illustrating an example of a container migration system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as container migration code 200.

For example, container migration code 200 receives an input to migrate a container that is providing a service from one host node to another host node. The other host node can reside on the same site or a different site. In response to receiving the input to migrate the container, container migration code 200 queues write input/output operations of the container being migrated in operating system memory so that the container being migrated now only processes read input/output operations corresponding to the service before container migration code 200 executes a commit command to generate a new container image from the container being migrated. Then, container migration code 200 executes the commit command to generate the container image based on the container being migrated. Container migration code 200 generates the container image by generating a new read only layer in the container image based on contents of a read/write layer of the container being migrated. The new read only layer is a top layer or an upper most layer of the container image with the original set of read only layers being stacked below or underneath the new read only layer.

In response to generating the container image, container migration code 200 resumes the write input/output operations to the container being migrated using the previously queued write input/output operations corresponding to the container being migrated and any new incoming write input/output operations to the container being migrated so that the container being migrated is once again processing both read input/output operations and write input/output operations corresponding to the service. In addition, container migration code 200 sends a copy of the container image to the other host node. In response to sending the copy of the container image to the other host node, container migration code 200 generates another container on the other host node using the container image. Further, container migration code 200 starts the other container on the other host node and performs a health check on the other container after being started.

In response to container migration code 200 determining that the other container on the other host node is running in a healthy state based on performing the health check, container migration code 200 immediately queues write input/output operations of the other container running on the other host node in operating system memory so that the other container running on the other host node only processes the read input/output operations corresponding to the service. Furthermore, container migration code 200 once again queues the write input/output operations of the container being migrated in the operating system memory so that the container being migrated is only processing read input/output operations again.

In response to container migration code 200 once again queuing the write input/output operations of the container being migrated, container migration code 200 generates another container image based on the container being migrated. Container migration code 200 generates the other container image by generating a new different read only layer in the other container image based on contents of the read/write layer of the container being migrated since a time when container migration code 200 resumed the write input/output operations to the container being migrated. In other words, the new different read only layer in the other container image only includes data changes made by write input/output operations after container migration code 200 generated the new read only in the container image. The new different read only layer is a top layer or an upper most layer of the other container image.

Then, container migration code 200 performs a comparison between the container image and the other container image. Based on the comparison, container migration code 200 determines whether any differences exist between content of the new read only layer of the container image and content of the new different read only layer of the other container image, which includes any data changes made by write input/output operations occurring between the time when container migration code 200 resumed write input/output operations to the container being migrated and the time when container migration code 200 generated the new different read only layer in the other container image. If container migration code 200 determines that a difference does exist between the content of the new read only layer of the container image and the content of the new different read only layer of the other container image, then container migration code 200 sends a copy of the difference (i.e., the data changes) to the other host node. In addition, container migration code 200 merges the difference into a read/write layer of the other container running on the other host node.

Afterward, container migration code 200 resumes write input/output operations to the other container running on the other host node using the previously queued write input/output operations corresponding to the other container and any new incoming write input/output operations to the other container so that the other container running on the other host node is now processing all the read input/output operations and the write input/output operations corresponding to the service ensuring uninterrupted service (e.g., uninterrupted container input/output flow corresponding to the service). Further, container migration code 200 deletes the container that has been migrated from the host node to complete the container migration process.

In addition to container migration code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container migration code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in container migration code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the container migration services provided by computer 101), and may take any of the forms discussed above in connection with computer 101. EUD 103 typically receives helpful and useful data from the operations of computer 101. For example, in a hypothetical case where computer 101 is designed to provide a container migration recommendation to the end user, this recommendation would typically be communicated from network module 115 of computer 101 through WAN 102 to EUD 103. In this way, EUD 103 can display, or otherwise present, the container migration recommendation to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container migration recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With the increase of container-based technology, containers are becoming widely used in many areas. In certain situations, a container may need to be migrated from one host node to another host node on the same site or a different site. During this container migration process, it takes time for the new container to startup on the other node. As a result, the service provided by the container being migrated can be interrupted.

Illustrative embodiments provide fast and efficient container migration based on changes in a read/write layer of the container's file system. The container's file system may be, for example, a union file system or the like. A union file system is not one single file system, but a type of file system that allows files and directories of separate file systems to be overlaid, forming a single coherent file system.

Illustrative embodiments execute two commit commands. After illustrative embodiments queue write input/output operations corresponding to a container being migrated, illustrative embodiments execute the first commit command to generate a new container image based on content in a read/write layer of the container being migrated. After generating the new container image, illustrative embodiments resume write input/output operations to the container being migrated. In addition, illustrative embodiments generate another container on the other host node using the new container image. In response to generating the other container on the other host node, illustrative embodiments queue the write input/output operations to the other container running on the other host node and also queue the write input/output operations to the container being migrated once again.

Afterward, illustrative embodiments execute the second commit command to generate yet another new container image based on the content in the read/write layer of the container being migrated. Illustrative embodiments then determine the differences between the two new container images. Illustrative embodiments send the differences (i.e., data changes) to the other container running on the other host node to ensure uninterrupted service (e.g., uninterrupted container input/output flow corresponding to the service) to a maximum extent. Thus, illustrative embodiments eliminate or decrease the time of input/output flow outage to ensure the uninterrupted and stable operation of the service.

Thus, illustrative embodiments provide one or more technical solutions that overcome a technical problem with an inability of current container-based environments to migrate containers without service interruption. As a result, these one or more technical solutions provide a technical effect and practical application in the field of container-based environments.

With reference now to FIG. 2, a diagram illustrating an example of a container migration system is depicted in accordance with an illustrative embodiment. Container migration system 201 may be implemented in a computing environment, such as computing environment 100 in FIG. 1. Container migration system 201 is a system of hardware and software components for efficiently migrating containers between host nodes for uninterrupted service.

In this example, container migration system 201 includes controller node 202, host node 1 204, and host node 2 206. Controller node 202 can be, for example, computer 101 in FIG. 1. Host node 1 204 and host node 2 206 can be, for example, host physical machine set 142 or virtual machine set 143 in FIG. 1. However, it should be noted that container migration system 201 is intended as an example only and not as a limitation on illustrative embodiments. For example, container migration system 201 can include any number of controller nodes, host nodes, and other devices and components not shown.

In this example, controller node 202 includes container migration code 208, such as, for example, container migration code 200 in FIG. 1. Container migration code 208 is comprised of four modules. The four modules include scheduler and management module 210, new layer generation modules 212, layer comparison module 214, and layer content copy module 216. However, it should be noted that container migration code 208 is intended as an example only and not as a limitation on illustrative embodiments. In other words, container migration code 208 can include more or fewer modules than shown. For example, two or more modules shown can be combined into one module, one module shown can be divided into two or more modules, a module shown can be deleted, a module not shown can be added, or the like.

Controller node 202 utilizes scheduler and management module 210 to schedule and manage container migration tasks and to coordinate with each of new layer generation module 212, layer comparison module 214, and layer content copy module 216 to control read and write input/output operation flows corresponding to a service at various stages during container migration tasks. Scheduler and management module 210 ensures uninterrupted read and write input/output operation flows corresponding to the service during container migration to the maximum extent. Moreover, scheduler and management module 210 increases the portability of containers by quickly and efficiently migrating the containers to different host nodes.

Controller node 202 utilizes new layer generation module 212 to generate a new read only layer based on contents of a read/write layer in a container providing the service. Afterward, new layer generation module 212 generates a new container image that includes the new read only layer as the top layer of the new container image with all of the original read only layers of the original container image as lower layers.

Controller node 202 utilizes layer comparison module 214 to compare the two container images to determine the difference (i.e., changed part in metadata and file content) between the two container images. Controller node 202 utilizes layer content copy module 216 to retrieve any determined differences in the content of the two container images from layer comparison module 214. Afterward, layer content copy module 216 sends a copy of any determined differences in the content of the two container images to the other host node where the container is being migrated to. Alternatively, instead of sending a copy of any determined differences in the content to the other host node, layer content copy module 216 can send the entire new container image that includes the changed part in metadata and file content to the other host node.

In this example, host node 1 204 includes container 1 218. However, it should be noted that host node 1 204 can include any number of containers. Host node 1 204 utilizes container 1 218 to process read and write input/output operations 220 corresponding to service 222.

Host node 2 206 includes container 2 224. It should be noted that host node 2 206 can be located at the same site as host node 1 204 or at a site located remotely from the site where host node 1 204 is located. Also, container 2 224 is container 1 218 after being migrated to host node 2 206 from host node 1 204 by controller node 202 using each of scheduler and management module 210, new layer generation modules 212, layer comparison module 214, and layer content copy module 216 of container migration code 208. Host node 2 206 utilizes container 2 224 to process read and write input/output operations 226 corresponding to service 222. Read and write input/output operations 226 are similar to read and write input/output operations 220, but read and write input/output operations 226 represent new incoming read and write input/output operations corresponding to service 222 after controller node 202 migrated container 1 218 to host node 2 206 as container 2 224.

Figure 3:
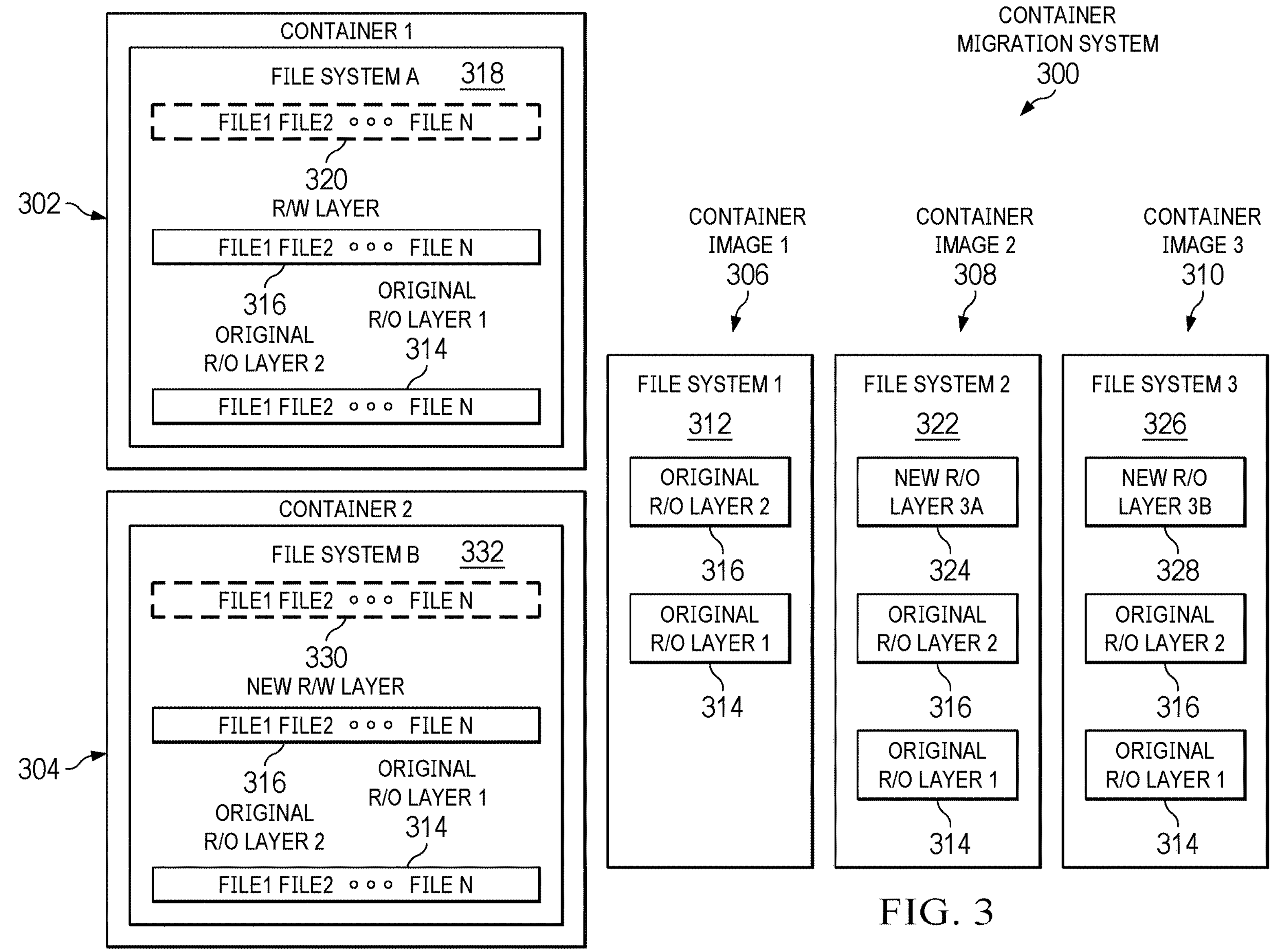
FIG. 3 is a diagram illustrating an example of containers and images in accordance with an illustrative embodiment.
Figure 4B:
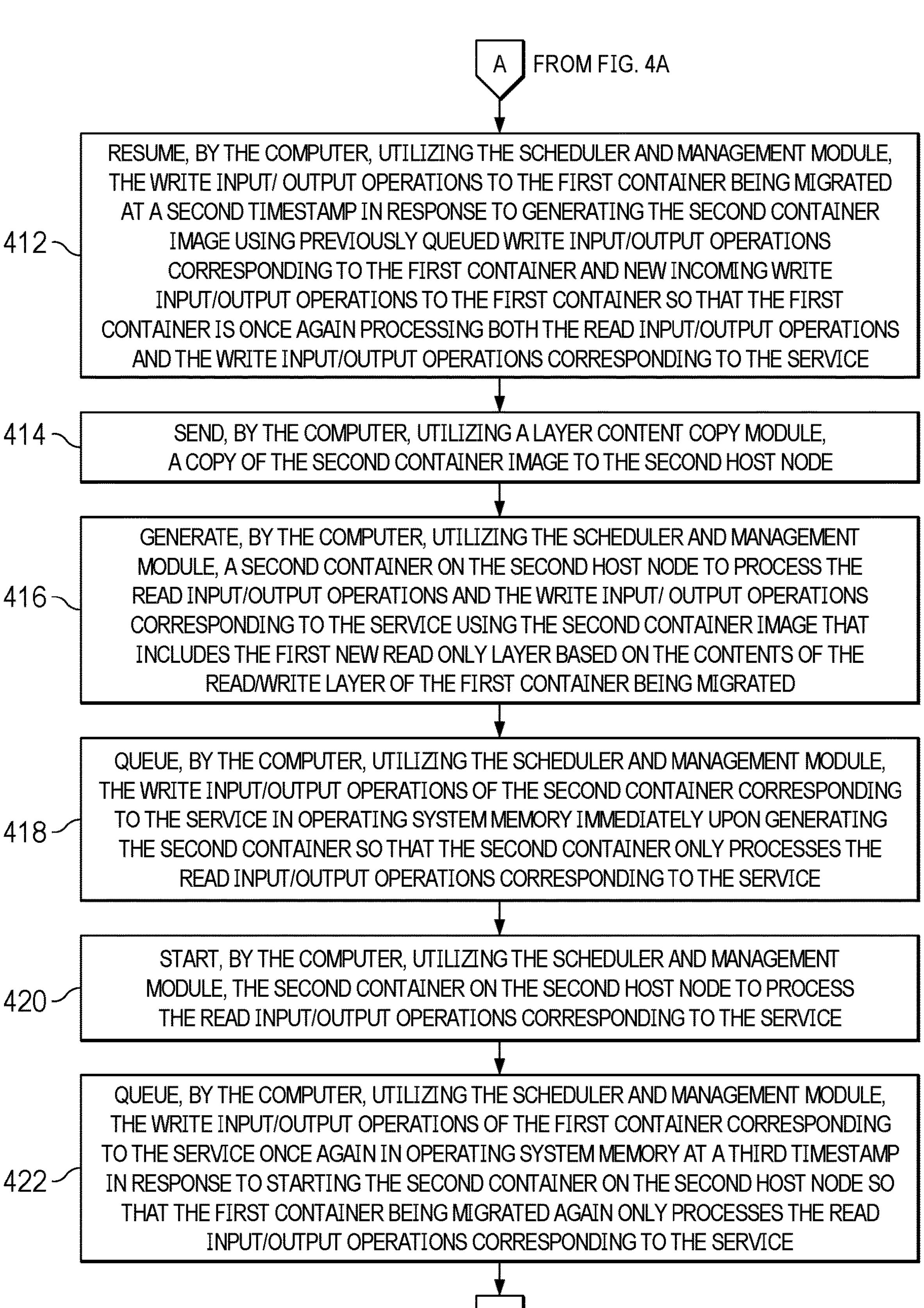
Figure 4C:
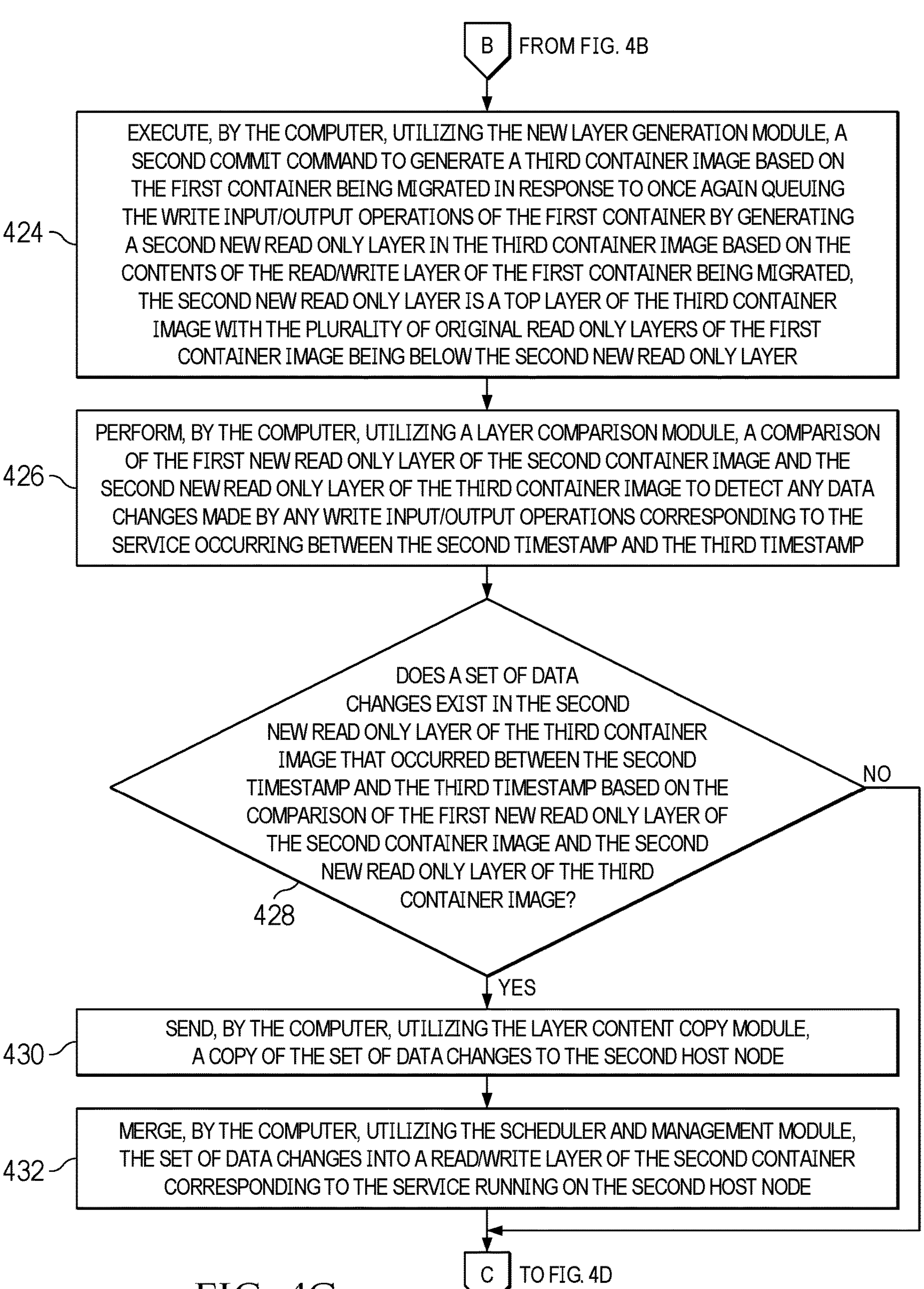
Figure 4D:
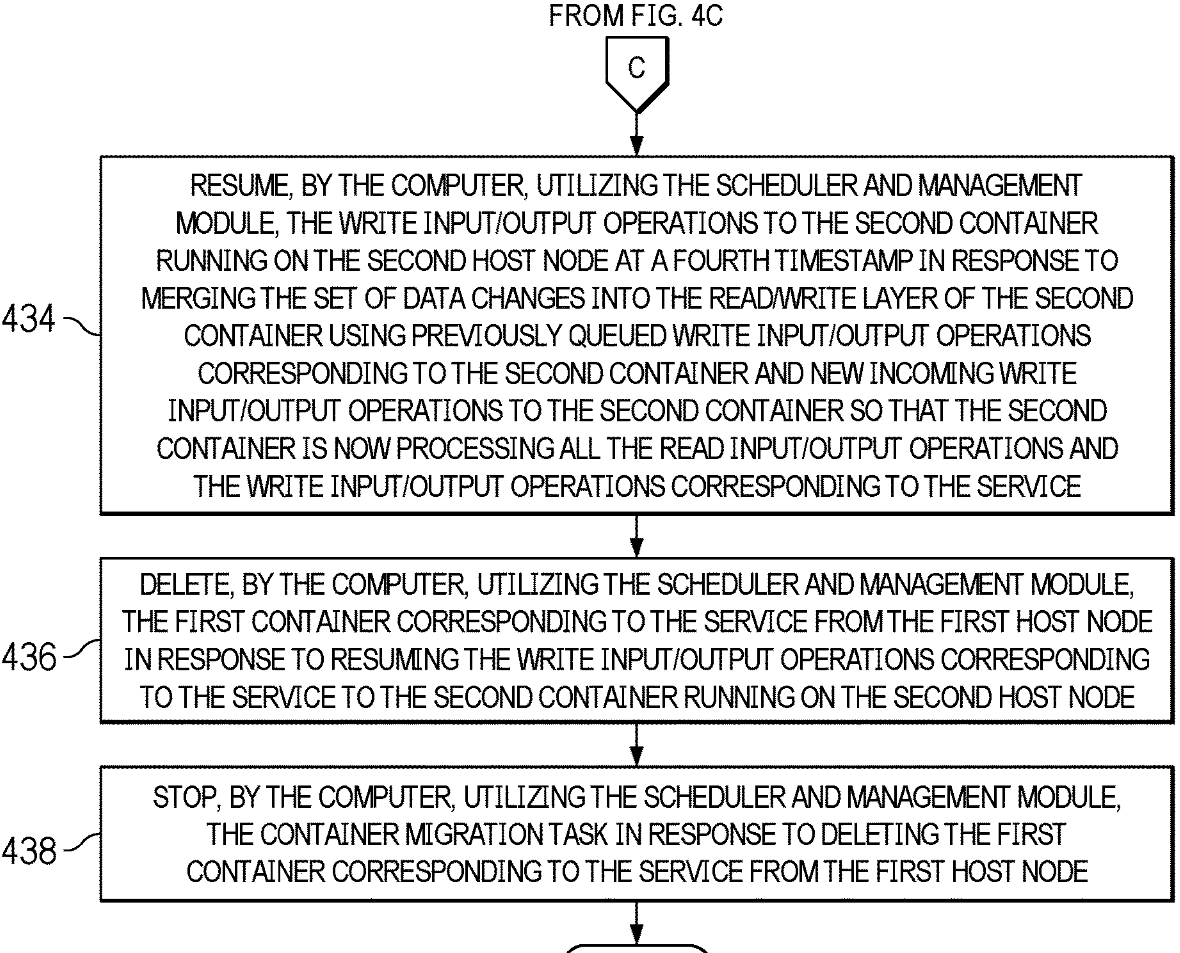

With reference now to FIG. 3, a diagram illustrating an example of containers and images is depicted in accordance with an illustrative embodiment. Containers and images 300 can be implemented in, for example, computing environment 100 in FIG. 1 or container migration system 201 in FIG. 2.

In this example, containers and images 300 include container 1 302, container 2 304, container image 1 306, container image 2 308, and container image 3 310. Container 1 302 and container 2 304 can be, for example, container 1 218 and container 2 224 in FIG. 2. In addition, container 1 302 and container 2 304 are located on different host nodes, such as, for example, host node 1 204 and host node 2 206 in FIG. 2. Further, it should be noted that container 1 302 and container 2 304 are similar to container 1 218 and container 2 224 in FIG. 2 in that container 2 304 is container 1 302 after being migrated to a different host node by a controller node, such as, for example, controller node 202 in FIG. 2.

Container image 1 306 includes file system 1 312. Container image 1 306 utilizes file system 1 312 to store content. File system 1 312 may be, for example, a union file system or the like. File system 1 312 includes a set of layers, each layer including a plurality of files utilized during different container build stages. In addition, the layers are stacked on top of each other. For example, file system 1 312 includes original read only layer 1 314 and original read only layer 2 316. However, it should be noted that file system 1 312 is intended as an example only and not as a limitation on illustrative embodiments. In other words, file system 1 312 may include any number of stacked layers.

When a new container is generated, a new writeable layer is added as a top layer over the underlying original image read only layers. For example, the controller node utilizes container image 1 306 to generate container 1 302, which includes file system A 318. When generating container 1 302, the controller node adds read/write layer 320 as a top layer or upper most layer of file system A 318 over original read only layer 1 314 and original read only layer 2 316. It should be noted that original read only layer 1 314 and original read only layer 2 316 in file system A 318 are the same as original read only layer 1 314 and original read only layer 2 316 in file system 1 312 of container image 1 306.

The writeable layer (e.g., read/write layer 320) is typically called the "container layer." All changes made by write input/output operations, such as, for example, writing new files, modifying existing files, deleting files, and the like, to a running container (e.g., container 1 302) are written to the writeable layer of the file system (e.g., file system A 318) in the running container. For example, a copy-on-write process triggers a copy-up operation when data in a file within a read only layer (e.g., original read only layer 1 314 in file system A 318) is modified by a write input/output operation. In other words, all writes to the running container that adds new data or modifies existing data are stored in this writable layer.

When the controller node receives an input to migrate container 1 302 to another host node as container 2 304, the controller node executes a commit command to generate a new container image (e.g., container image 2 308, which includes file system 2 322) based on container 1 302. File system 2 322 of container image 2 308 includes original read only layer 1 314, original read only layer 2 316, and new read only layer 3A 324 as a top layer. The controller node generates new read only layer 3A 324 based on the contents of read/write layer 320 of container 1 302. In other words, new read only layer 3A 324 now contains any data changes to one or more files of container 1 302 made by a set of write input/output operations.

After generating container image 2 308, the controller node generates container 2 304 using container image 2 308. Then, the controller node starts container 2 304 on the other host node and performs a health check of container 2 304. However, it takes time to start container 2 304 and perform the health check. As a result, after completing the health check, the controller node generates another new container image (e.g., container image 3 310, which includes file system 3 326). File system 3 326 of container image 3 310 includes original read only layer 1 314, original read only layer 2 316, and new read only layer 3B 328 as a top layer. The controller node generates new read only layer 3B 328 based on read/write layer 320 of container 1 302, which will include any data changes to files of container 1 302 that may have occurred during the period when container 2 304 was starting.

The controller node will compare container image 2 308 and container image 3 310 to determine whether any data changes to files have occurred during the period when container 2 304 was starting. If the controller node determines that a difference exists between new read only layer 3A 324 and new read only layer 3B 328, then the controller node identifies those differences and merges those differences (i.e., the data changes) into new read/write layer 330 of file system B 332 in container 2 304. Afterward, container 2 304 now processes all read and write input/output operations and the controller node deletes container 1 302.

With reference now to FIGS. 4A-4D, a flowchart illustrating a process for container migration is shown in accordance with an illustrative embodiment. The process shown in FIGS. 4A-4D may be implemented in a computer, such as, for example, computer 101 in FIG. 1 or controller node 202 in FIG. 2. For example, the process shown in FIGS. 4A-4D may be implemented by container migration code 200 in FIG. 1 or container migration code 208 in FIG. 2.

The process begins when the computer receives a first input to generate a first container on a first host node to process read input/output operations and write input/output operations corresponding to a service using a first container image that includes a plurality of original read only layers (step 402). The computer, utilizing a scheduler and management module, generates the first container on the first host node to process the read input/output operations and the write input/output operations corresponding to the service using the first container image that includes the plurality of original read only layers in response to receiving the first input to generate the first container on the first host node (step 404).

Subsequently, the computer receives a second input to perform a container migration task to migrate the first container corresponding to the service from the first host node to a second host node (step 406). The second host node resides on one of a same site as the first host node or a different site. The computer, utilizing the scheduler and management module, queues the write input/output operations of the first container corresponding to the service in operating system memory at a first timestamp so that the first container being migrated now only processes the read input/output operations corresponding to the service in response to receiving the second input to perform the container migration task (step 408).

The computer, utilizing a new layer generation module, executes a first commit command to generate a second container image based on the first container being migrated in response to queuing the write input/output operations of the first container by generating a first new read only layer in the second container image based on contents of a read/write layer of the first container being migrated (step 410). The first new read only layer is a top layer of the second container image with the plurality of original read only layers of the first container image being below the first new read only layer. Afterward, the computer, utilizing the scheduler and management module, resumes the write input/output operations to the first container being migrated at a second timestamp in response to generating the second container image using previously queued write input/output operations corresponding to the first container and new incoming write input/output operations to the first container so that the first container is once again processing both the read input/output operations and the write input/output operations corresponding to the service (step 412).

The computer, utilizing a layer content copy module, sends a copy of the second container image to the second host node (step 414). The computer, utilizing the scheduler and management module, generates a second container on the second host node to process the read input/output operations and the write input/output operations corresponding to the service using the second container image that includes the first new read only layer based on the contents of the read/write layer of the first container being migrated (step 416). In addition, the computer, utilizing the scheduler and management module, queues the write input/output operations of the second container corresponding to the service in operating system memory immediately upon generating the second container so that the second container only processes the read input/output operations corresponding to the service (step 418).

The computer, utilizing the scheduler and management module, starts the second container on the second host node to process the read input/output operations corresponding to the service (step 420). In addition, the computer, utilizing the scheduler and management module, queues the write input/output operations of the first container corresponding to the service once again in operating system memory at a third timestamp in response to starting the second container on the second host node so that the first container being migrated again only processes the read input/output operations corresponding to the service (step 422).

Further, the computer, utilizing the new layer generation module, executes a second commit command to generate a third container image based on the first container being migrated in response to once again queuing the write input/output operations of the first container by generating a second new read only layer in the third container image based on the contents of the read/write layer of the first container being migrated (step 424). The second new read only layer is a top layer of the third container image with the plurality of original read only layers of the first container image being below the second new read only layer.

The computer, utilizing a layer comparison module, performs a comparison of the first new read only layer of the second container image and the second new read only layer of the third container image to detect any data changes made by any write input/output operations corresponding to the service occurring between the second timestamp when the write input/output operations were resumed to the first container on the first host node and the third timestamp when the write input/output operations of the first container were queued to operating system memory for a second time (step 426). The computer, utilizing a layer comparison module, makes a determination as to whether a set of data changes exists in the second new read only layer of the third container image that occurred between the second timestamp and the third timestamp based on the comparison of the first new read only layer of the second container image and the second new read only layer of the third container image (step 428).

If the computer, utilizing a layer comparison module, determines that a set of data changes does not exist in the second new read only layer of the third container image based on the comparison of the first new read only layer of the second container image and the second new read only layer of the third container image, no output of step 428, then the process proceeds to step 434. If the computer, utilizing a layer comparison module, determines that a set of data changes does exist in the second new read only layer of the third container image that occurred between the second timestamp and the third timestamp based on the comparison of the first new read only layer of the second container image and the second new read only layer of the third container image, yes output of step 428, then the computer, utilizing the layer content copy module, sends a copy of the set of data changes to the second host node (step 430). In addition, the computer, utilizing the scheduler and management module, merges the set of data changes into a read/write layer of the second container corresponding to the service running on the second host node (step 432).

Moreover, the computer, utilizing the scheduler and management module, resumes the write input/output operations to the second container running on the second host node at a fourth timestamp in response to merging the set of data changes into the read/write layer of the second container using previously queued write input/output operations corresponding to the second container and new incoming write input/output operations to the second container so that the second container is now processing all the read input/output operations and the write input/output operations corresponding to the service (step 434). Furthermore, the computer, utilizing the scheduler and management module, deletes the first container corresponding to the service from the first host node in response to resuming the write input/output operations corresponding to the service to the second container running on the second host node (step 436). The computer, utilizing the scheduler and management module, stops the container migration task in response to deleting the first container corresponding to the service from the first host node (step 438). Thereafter, the process terminates.

Thus, illustrative embodiments of the present disclosure provide a computer-implemented method, computer system, and computer program product for container migration. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for container migration, the computer-implemented method comprising:

performing, by a computer, a comparison of a first new read only layer of a second container image and a second new read only layer of a third container image to detect any data changes made by write input/output operations corresponding to a service occurring between a second timestamp when the write input/output operations were resumed to a first container on a first host node and a third timestamp when the write input/output operations of the first container were queued to operating system memory for a second time;

determining, by the computer, whether a set of data changes exists in the second new read only layer of the third container image that occurred between the second timestamp and the third timestamp based on the comparison;

responsive to the computer determining that the set of data changes does exist in the second new read only layer of the third container image that occurred between the second timestamp and the third timestamp based on the comparison, sending, by the computer, a copy of the set of data changes to a second host node;

merging, by the computer, the set of data changes into a read/write layer of the second container corresponding to the service running on the second host node; and resuming, by the computer, the write input/output operations to the second container running on the second host node at a fourth timestamp using previously queued write input/output operations corresponding to the second container and new incoming write input/output operations to the second container so that the second container is processing read input/output operations and the write input/output operations corresponding to the service.

2. The computer-implemented method of claim 1, further comprising:

receiving, by the computer, a first input to generate the first container on the first host node to process the read input/output operations and the write input/output operations corresponding to the service using a first container image; and generating, by the computer, the first container on the first host node to process the read input/output operations and the write input/output operations corresponding to the service using the first container image.

3. The computer-implemented method of claim 2, further comprising:

receiving, by the computer, a second input to migrate the first container corresponding to the service from the first host node to the second host node; and queuing, by the computer, the write input/output operations of the first container corresponding to the service in operating system memory at a first timestamp so that the first container being migrated only processes the read input/output operations corresponding to the service in response to receiving the second input to migrate the first container.

4. The computer-implemented method of claim 3, further comprising:

executing, by the computer, a first commit command to generate the second container image based on the first container being migrated by generating the first new read only layer in the second container image based on contents of a read/write layer of the first container being migrated; and resuming, by the computer, the write input/output operations to the first container being migrated at a second timestamp using previously queued write input/output operations corresponding to the first container and new incoming write input/output operations to the first container so that the first container is processing both the read input/output operations and the write input/output operations corresponding to the service.

5. The computer-implemented method of claim 4, further comprising:

sending, by the computer, a copy of the second container image to the second host node;

generating, by the computer, the second container on the second host node to process the read input/output operations and the write input/output operations corresponding to the service using the second container image that includes the first new read only layer based on the contents of the read/write layer of the first container being migrated;

queuing, by the computer, the write input/output operations of the second container corresponding to the service in operating system memory upon generating the second container so that the second container only processes the read input/output operations corresponding to the service; and starting, by the computer, the second container on the second host node to process the read input/output operations corresponding to the service.

6. The computer-implemented method of claim 5, further comprising:

queuing, by the computer, the write input/output operations of the first container corresponding to the service again in operating system memory at a third timestamp in response to starting the second container on the second host node so that the first container being migrated again only processes the read input/output operations corresponding to the service; and executing, by the computer, a second commit command to generate the third container image based on the first container being migrated by generating the second new read only layer in the third container image based on the contents of the read/write layer of the first container being migrated.

7. The computer-implemented method of claim 1, further comprising:

deleting, by the computer, the first container corresponding to the service from the first host node in response to resuming the write input/output operations corresponding to the service to the second container running on the second host node.

8. A computer system for container migration, the computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

perform a comparison of a first new read only layer of a second container image and a second new read only layer of a third container image to detect any data changes made by write input/output operations corresponding to a service occurring between a second timestamp when the write input/output operations were resumed to a first container on a first host node and a third timestamp when the write input/output operations of the first container were queued to operating system memory for a second time;

determine whether a set of data changes exists in the second new read only layer of the third container image that occurred between the second timestamp and the third timestamp based on the comparison;

send a copy of the set of data changes to a second host node in response to determining that the set of data changes does exist in the second new read only layer of the third container image that occurred between the second timestamp and the third timestamp based on the comparison;

merge the set of data changes into a read/write layer of the second container corresponding to the service running on the second host node; and resume the write input/output operations to the second container running on the second host node at a fourth timestamp using previously queued write input/output operations corresponding to the second container and new incoming write input/output operations to the second container so that the second container is processing read input/output operations and the write input/output operations corresponding to the service.

9. The computer system of claim 8, wherein the set of processors further executes the program instructions to:

receive a first input to generate the first container on the first host node to process the read input/output operations and the write input/output operations corresponding to the service using a first container image; and generate the first container on the first host node to process the read input/output operations and the write input/output operations corresponding to the service using the first container image.

10. The computer system of claim 9, wherein the set of processors further executes the program instructions to:

receive a second input to migrate the first container corresponding to the service from the first host node to the second host node; and queue the write input/output operations of the first container corresponding to the service in operating system memory at a first timestamp so that the first container being migrated only processes the read input/output operations corresponding to the service in response to receiving the second input to migrate the first container.

11. The computer system of claim 10, wherein the set of processors further executes the program instructions to:

execute a first commit command to generate the second container image based on the first container being migrated by generating the first new read only layer in the second container image based on contents of a read/write layer of the first container being migrated; and resume the write input/output operations to the first container being migrated at a second timestamp using previously queued write input/output operations corresponding to the first container and new incoming write input/output operations to the first container so that the first container is processing both the read input/output operations and the write input/output operations corresponding to the service.

12. The computer system of claim 11, wherein the set of processors further executes the program instructions to:

send a copy of the second container image to the second host node;

generate the second container on the second host node to process the read input/output operations and the write input/output operations corresponding to the service using the second container image that includes the first new read only layer based on the contents of the read/write layer of the first container being migrated;

queue the write input/output operations of the second container corresponding to the service in operating system memory upon generating the second container so that the second container only processes the read input/output operations corresponding to the service; and start the second container on the second host node to process the read input/output operations corresponding to the service.

13. The computer system of claim 12, wherein the set of processors further executes the program instructions to:

queue the write input/output operations of the first container corresponding to the service again in operating system memory at a third timestamp in response to starting the second container on the second host node so that the first container being migrated again only processes the read input/output operations corresponding to the service; and execute a second commit command to generate the third container image based on the first container being migrated by generating the second new read only layer in the third container image based on the contents of the read/write layer of the first container being migrated.

14. A computer program product for container migration, the computer program product comprising a set of computer-readable storage media having program instructions collectively stored therein, the program instructions executable by a computer to cause the computer to:

perform a comparison of a first new read only layer of a second container image and a second new read only layer of a third container image to detect any data changes made by write input/output operations corresponding to a service occurring between a second timestamp when the write input/output operations were resumed to a first container on a first host node and a third timestamp when the write input/output operations of the first container were queued to operating system memory for a second time;

determine whether a set of data changes exists in the second new read only layer of the third container image that occurred between the second timestamp and the third timestamp based on the comparison;

send a copy of the set of data changes to a second host node in response to determining that the set of data changes does exist in the second new read only layer of the third container image that occurred between the second timestamp and the third timestamp based on the comparison;

merge the set of data changes into a read/write layer of the second container corresponding to the service running on the second host node; and resume the write input/output operations to the second container running on the second host node at a fourth timestamp using previously queued write input/output operations corresponding to the second container and new incoming write input/output operations to the second container so that the second container is processing read input/output operations and the write input/output operations corresponding to the service.

15. The computer program product of claim 14, wherein the program instructions further cause the computer to:

receive a first input to generate the first container on the first host node to process the read input/output operations and the write input/output operations corresponding to the service using a first container image; and generate the first container on the first host node to process the read input/output operations and the write input/output operations corresponding to the service using the first container image.

16. The computer program product of claim 15, wherein the program instructions further cause the computer to:

receive a second input to migrate the first container corresponding to the service from the first host node to the second host node; and queue the write input/output operations of the first container corresponding to the service in operating system memory at a first timestamp so that the first container being migrated only processes the read input/output operations corresponding to the service in response to receiving the second input to migrate the first container.

17. The computer program product of claim 16, wherein the program instructions further cause the computer to:

execute a first commit command to generate the second container image based on the first container being migrated by generating the first new read only layer in the second container image based on contents of a read/write layer of the first container being migrated; and resume the write input/output operations to the first container being migrated at a second timestamp using previously queued write input/output operations corresponding to the first container and new incoming write input/output operations to the first container so that the first container is processing both the read input/output operations and the write input/output operations corresponding to the service.

18. The computer program product of claim 17, wherein the program instructions further cause the computer to:

send a copy of the second container image to the second host node;

generate the second container on the second host node to process the read input/output operations and the write input/output operations corresponding to the service using the second container image that includes the first new read only layer based on the contents of the read/write layer of the first container being migrated;

queue the write input/output operations of the second container corresponding to the service in operating system memory upon generating the second container so that the second container only processes the read input/output operations corresponding to the service; and start the second container on the second host node to process the read input/output operations corresponding to the service.

19. The computer program product of claim 18, wherein the program instructions further cause the computer to:

queue the write input/output operations of the first container corresponding to the service again in operating system memory at a third timestamp in response to starting the second container on the second host node so that the first container being migrated again only processes the read input/output operations corresponding to the service; and execute a second commit command to generate the third container image based on the first container being migrated by generating the second new read only layer in the third container image based on the contents of the read/write layer of the first container being migrated.

20. The computer program product of claim 14, wherein the program instructions further cause the computer to:

delete the first container corresponding to the service from the first host node in response to resuming the write input/output operations corresponding to the service to the second container running on the second host node.

* * * * *